United States Patent
Berr et al.

(10) Patent No.: US 10,415,499 B2
(45) Date of Patent: Sep. 17, 2019

(54) METHOD FOR PRODUCING A PISTON FOR AN INTERNAL COMBUSTION ENGINE AND PISTON PRODUCED BY SAID METHOD

(71) Applicant: Mahle International GmbH, Stuttgart (DE)

(72) Inventors: Gerhard Berr, Aspach (DE); Sascha-Oliver Boczek, Dielheim (DE); Reiner Mueller, Rottweil (DE); Rainer Scharp, Vaihingen (DE)

(73) Assignee: Mahle International GmbH (DE)

( * ) Notice: Subject to any disclaimer, the term of this patent is extended or adjusted under 35 U.S.C. 154(b) by 679 days.

(21) Appl. No.: 14/778,074

(22) PCT Filed: Mar. 18, 2014

(86) PCT No.: PCT/DE2014/000139
§ 371 (c)(1),
(2) Date: Sep. 17, 2015

(87) PCT Pub. No.: WO2014/146637
PCT Pub. Date: Sep. 25, 2014

(65) Prior Publication Data
US 2016/0281636 A1    Sep. 29, 2016

(30) Foreign Application Priority Data

Mar. 18, 2013 (DE) .......... 10 2013 004 577
Aug. 28, 2013 (DE) .......... 10 2013 014 344

(51) Int. Cl.
*F02F 3/28*    (2006.01)
*B21K 1/18*    (2006.01)
(Continued)

(52) U.S. Cl.
CPC ............ *F02F 3/28* (2013.01); *B21K 1/185* (2013.01); *B23P 15/10* (2013.01); *F02F 3/003* (2013.01);
(Continued)

(58) Field of Classification Search
CPC .......... F02F 3/28; F02F 3/003; F02F 2200/04; F02F 3/22; F02F 2003/0061; B23P 15/10;
(Continued)

(56) References Cited

U.S. PATENT DOCUMENTS 5,778,846 A * 7/1998 Mielke ............... F02F 3/003
                                                    123/193.6
8,943,687 B2    2/2015 Scharp et al.
(Continued)

FOREIGN PATENT DOCUMENTS

DE    102011013067 A1    9/2012
DE    102011013141 A1    9/2012
(Continued)

OTHER PUBLICATIONS

German Search Report for DE-102013014344.6, dated Dec. 11, 2013.
(Continued)

*Primary Examiner* — Ryan J. Walters
(74) *Attorney, Agent, or Firm* — Fishman Stewart PLLC

(57) ABSTRACT

A method for producing a piston for an internal combustion engine may include the steps of: producing a first blank corresponding to a piston main body via a deformation process; producing a second blank corresponding to a piston ring part via at least one of a deformation process and a casting process; pre-machining the first blank and the second blank, and finishing a welding surface of the first blank and a welding surface of the second blank via machining; connecting the first blank and the second blank via welding (Continued)

the welding surface of the first blank to the welding surface of the second blank to form a piston body; and performing at least one of a secondary machining process and a finish machining process on the piston body to produce the piston.

18 Claims, 3 Drawing Sheets

(51) Int. Cl.
    *B23P 15/10*     (2006.01)
    *F02F 3/00*     (2006.01)
    *F02F 3/22*     (2006.01)
    *B23K 101/00*     (2006.01)

(52) U.S. Cl.
    CPC ... *B23B 2215/245* (2013.01); *B23K 2101/003* (2018.08); *F02F 3/22* (2013.01); *F02F 2003/0061* (2013.01); *F02F 2200/04* (2013.01)

(58) Field of Classification Search
    CPC .............. B21K 1/185; B23B 2215/245; B23K 2201/003
    See application file for complete search history.

(56) References Cited

U.S. PATENT DOCUMENTS

| | | |
|---|---|---|
| 2004/0231631 A1 | 11/2004 | Scharp |
| 2010/0006055 A1 | 1/2010 | Garcia et al. |
| 2012/0080004 A1* | 4/2012 | Menezes ................. F02F 3/003 123/193.6 |
| 2012/0222304 A1 | 9/2012 | Scharp et al. |
| 2012/0222305 A1 | 9/2012 | Scharp et al. |

FOREIGN PATENT DOCUMENTS

| | | |
|---|---|---|
| EP | 1077323 A2 | 2/2001 |
| EP | 1077323 B1 | 2/2001 |
| EP | 1905996 A1 | 4/2008 |
| JP | 2007-500608 A | 1/2007 |

OTHER PUBLICATIONS

Japanese Office Action dated Aug. 29, 2017 related to corresponding Japanese Patent Application No. 2016-503542.
Japanese Office Action dated Apr. 24, 2018 related to Japanese Patent Application No. 2016-503542.

* cited by examiner

METHOD FOR PRODUCING A PISTON FOR AN INTERNAL COMBUSTION ENGINE AND PISTON PRODUCED BY SAID METHOD

CROSS-REFERENCE TO RELATED APPLICATIONS

This application claims priority to German Patent Application No. 10 2013 004 577.0, filed Mar. 18, 2013, German Patent Application No. 10 2013 014 344.6, filed Aug. 28, 2013, and International Patent Application No. PCT/DE2014/000139, filed Mar. 18, 2014, all of which are hereby incorporated by reference in their entirety.

TECHNICAL FIELD

The present invention relates to a method for producing a piston for an internal combustion engine, having a piston main body and a piston ring part, wherein the piston main body has a combustion depression with a dome and has piston bosses equipped with boss bores, which piston bosses are connected to one another by way of running surfaces, wherein the piston ring section has a piston crown, an encircling fire land and an encircling ring section, and wherein the piston main body and the piston ring section form an encircling cooling duct. The present invention also relates to a piston that can be produced by way of said method.

BACKGROUND

A method for producing a piston is known from the German patent applications 10 2011 013 141 A1 and DE 10 2011 013 067 A1, in which method the blank of the piston main body is finished by forging in the entire region of the combustion depression. The contour of the combustion depression is thus not involved in the secondary machining process. Said production method can however be used only for pistons in which the piston upper part comprises the piston head and the piston lower part comprises the piston skirt. Other piston structures cannot be realized.

SUMMARY

It is the object of the present invention to further develop a generic method such that different piston structures can be realized.

The solution consists in that, in step a), during the production of the blank of the piston main body, the contour of the combustion depression is fully produced.

The present invention also relates to a piston producible by way of the method according to the invention.

The method according to the invention is characterized in that pistons can be produced in which the ring section can be composed of a different material thann structures. It is for example possible to realize pistons with a reinforced ring section.

Advantageous refinements will emerge from the sub-claims.

It is expediently provided that, in step c), cooling duct regions are formed into the blanks and/or are finish-machined, because the cooling duct regions are no longer accessible after the welding of the blanks.

It is furthermore advantageous if, in step c), in the blank of the piston main body, the interior space is finish-machined and inlet and outlet openings for cooling oil are formed into the cooling duct region. The piston main body is easier to handle for this purpose than the welded piston body.

Furthermore, based on the same considerations, it is recommended that, in step c), on the blank of the piston main body and/or of the piston ring part, the outer diameter be pre-machined, and/or, on the blank of the piston main body, the piston bosses be pre-machined.

A preferred refinement provides that, in step e), the boss bores are formed into the piston bosses after the piston crown has been finish-machined. Since the compression high of a piston is defined by the distance between the piston crown and central axis of the boss bore, the predetermined compression height of the finished piston can be obtained in a particularly simple manner.

Various deformation methods may be selected for the production of the blank of the piston main body. The blank may be forged by hot working at 1200° C. to 1300° C. and subsequently subjected to cold calibration. The blank may also be forged by hot working at 1200° C. to 1300° C. and subsequently subjected to cold working at a temperature of at most 150° C. The blank may furthermore be forged by warm working at 600° C. to 900° C. Furthermore, the blank may, after the warm working, be subjected to cold working at a temperature of at most 150° C. Finally, the blank may be forged by cold working at at most 150° C.

BRIEF DESCRIPTION OF THE DRAWINGS

An exemplary embodiment of the present invention will be discussed in more detail below on the basis of the appended drawings in which, in each case in a schematic illustration which is not to scale:

FIG. 1 shows an exemplary embodiment of a piston produced by way of the method according to the invention;

FIG. 2 shows a first exemplary embodiment of in each case one blank of a piston main body and of a piston ring part for a piston as per FIG. 1;

FIG. 3 shows the blanks as per FIG. 2 after pre-machining has been performed;

FIG. 4 shows a welded piston body formed from the pre-machined blanks as per FIG. 3.

DETAILED DESCRIPTION

FIG. 1 shows an exemplary embodiment of a piston 10 according to the invention. The piston 10 has a piston main body 11 with combustion depression 12 equipped with a central dome 13. The piston main body 11 furthermore has, in a manner known per se, piston bosses 14 with boss bores 15 for receiving a piston pin (not illustrated), and an interior space 24. The piston bosses 14 are connected to one another by way of running surfaces 16.

The piston 10 furthermore has a piston ring part 17 with a piston crown 18, with an encircling fire land 19 and with an encircling ring section 21 with annular grooves for receiving piston rings (not illustrated). An encircling cooling duct 22 with inlet and outlet openings for cooling oil (not illustrated) is provided at the level of the ring section 21.

In the present exemplary embodiment, the piston main body 11 and the piston ring part 17 are connected to one another by way of a welding process, for example electron beam welding or laser welding.

The piston main body 11 is produced from a material which can be subjected to a deformation process. This is typically a tempering steel, for example 42CrMo4 or an AFP steel such as 38MnVS6.

According to the invention, it is the intention to be able to produce even a combustion depression of complex geometry. It is the intention, furthermore, to be able to produce, by means of the method according to the invention, combustion depressions which are radially offset with respect to the piston central axis or which are in an inclined arrangement. Stated alternatively, the piston 10 may have a combustion depression 12 which is asymmetrical and/or radially offset with respect to the piston central axis and/or inclined.

Figure 2:
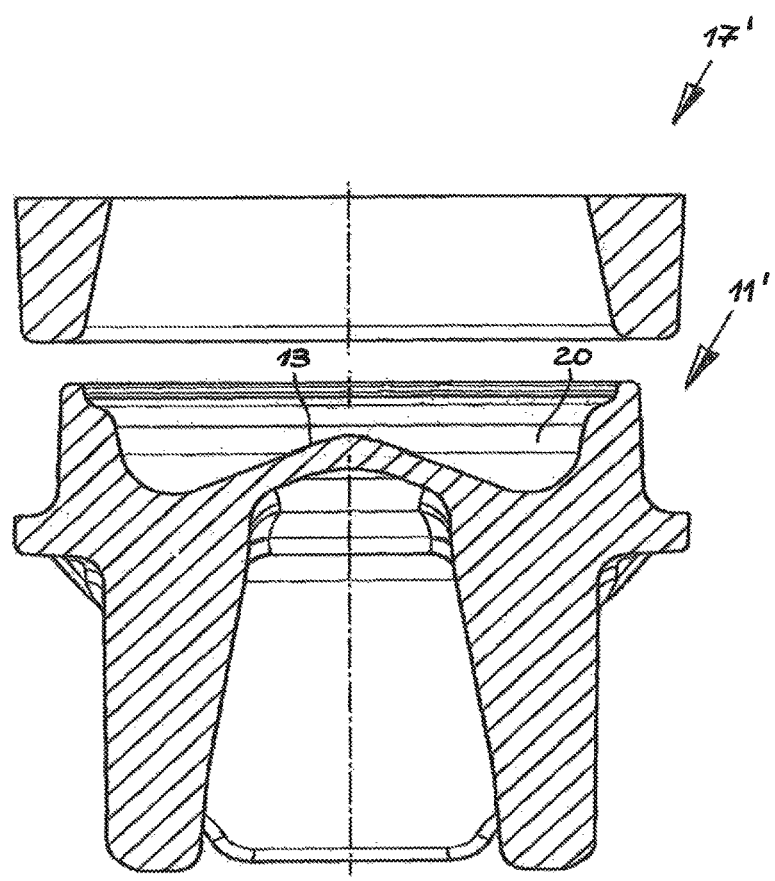

For this purpose, as illustrated in FIG. 2, it is firstly the case that blanks for the piston main body 11 and the piston ring part 17 are produced. The blank 11' for the piston main body 11 has, in the exemplary embodiment, been further processed by way of hot forming at 1200° to 1300° and subsequent cold calibration (pressing of the surfaces of the blank 11' at room temperature).

In the exemplary embodiment, the geometry of the combustion depression 12 is finished by forging. This means that, for the production of the finished piston 10, no secondary machining of the combustion depression 12 is necessary.

A blank 17' of the piston ring part 17 may be produced from any suitable material, for example by deformation or casting.

Figure 3:
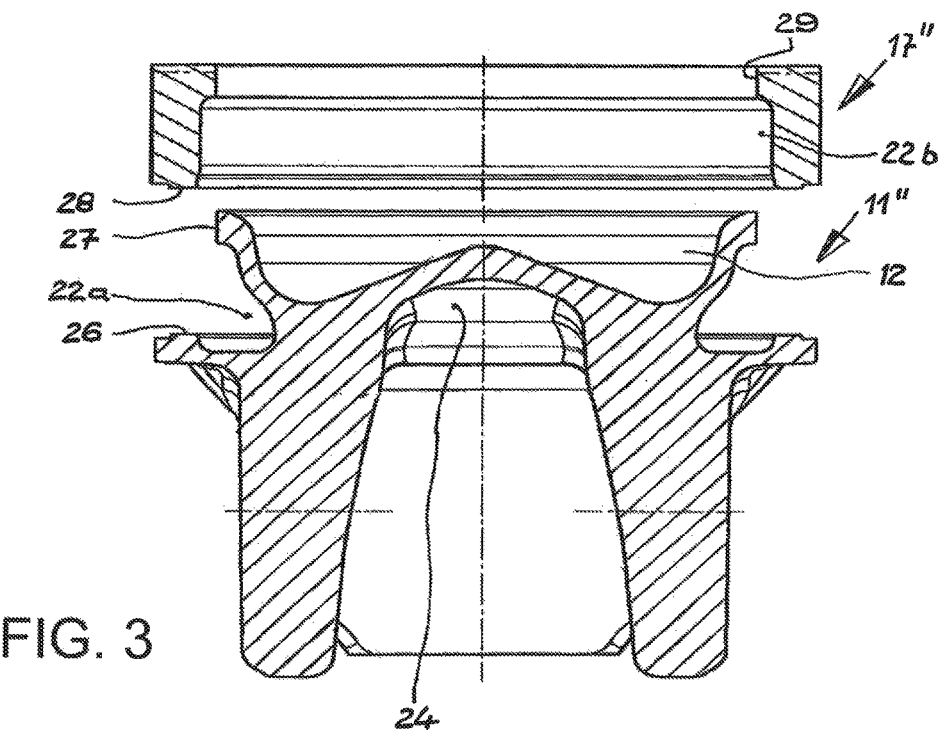

As illustrated in FIG. 3, it is possible, after the forging process, for the blanks 11', 17' to be pre-machined to form machined blanks 11", 17". On both blanks 11', 17', it is for example possible for the outer diameter to be pre-machined.

On the blank 11' for the piston main body 11, it is also possible for the boss region to be pre-machined. Finally, the interior space 24 can be finish-machined. Furthermore, a cooling duct region 22a, which in the finished piston 10 forms a part of the cooling duct 22, is formed into the blank 11'. The cooling duct region 22a may also be formed in during the forging process, and in this case is finish-machined after the forging process. The inlet and outlet openings for cooling oil are formed into the cooling duct region 22a.

On the blank 17' for the piston ring part 17, it is for example the case that a cooling duct region 22b, which in the finished piston 10 forms a part of the cooling duct 22, is formed into the blank 17'.

Finally, after the forging process, in both blanks 11', 17', the welding surfaces 26, 27 and 28, 29, respectively, by way of which the blanks 11', 17' are to be connected to one another, are finish-machined.

Figure 4:
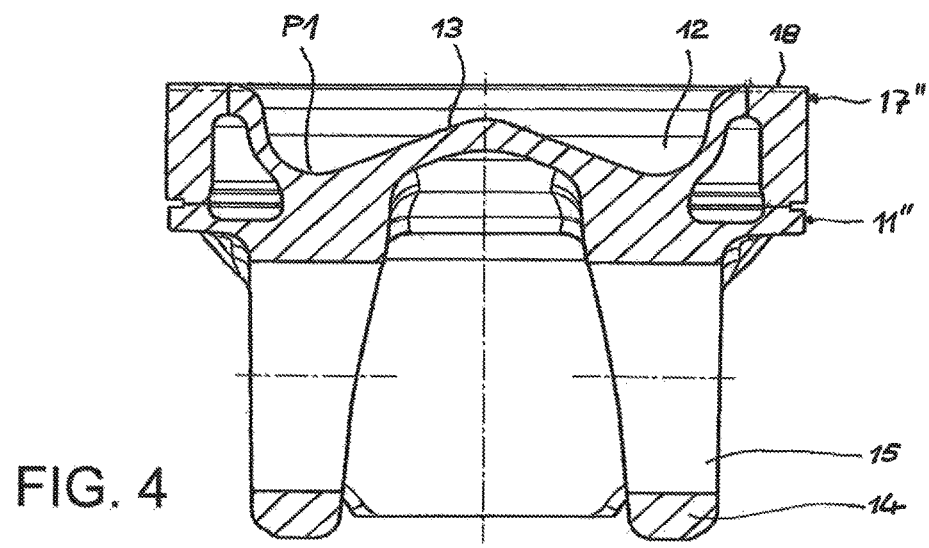

Then, the blanks 11", 17" are, by way of their welding surfaces 26 and 28, and 27 and 29, respectively, connected to one another in a manner known per se by way of a suitable welding process to form a piston body 30, such as is illustrated in FIG. 4.

Figure 1:
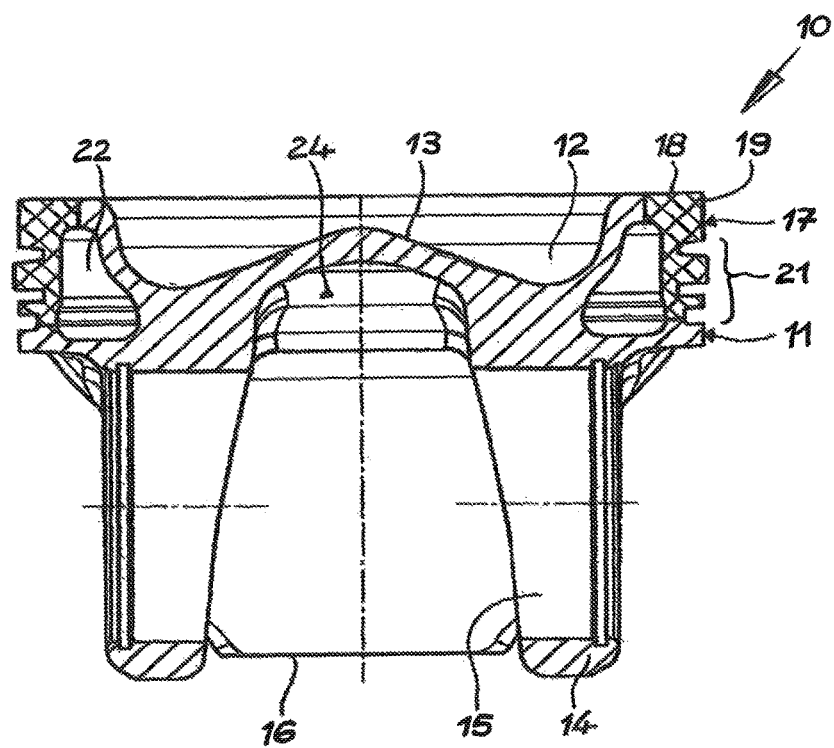

To complete the method according to the invention, the piston body 30 is finish-machined by virtue, for example, of the final fine contour being produced, the piston crown 18 being finish-machined and the annular grooves being formed into the ring section 21 and the boss bores 15 being formed into the piston bosses 14. The boss bores 15 are formed in such that the predetermined compression height of the finished piston is determined by the central axis of said boss bores in relation to the piston crown 18. A piston as per FIG. 1 is obtained as a result.

The invention claimed is:

1. A method for producing a piston for an internal combustion engine, comprising the steps of:
    a) producing a first blank corresponding to a piston main body via a deformation process, wherein producing the first blank corresponding to the piston main body includes providing a combustion depression defining a dome and a plurality of piston bosses connected to one another via a running surface, and wherein a contour of the combustion depression is fully produced;
    b) producing a second blank corresponding to a piston ring part via at least one of a deformation process and a casting process, wherein producing the second blank corresponding to the piston ring part includes providing a piston crown, an annular fire land and an annular ring section arranged away from a region of combustion with respect to the fire land, and wherein the first blank and the second blank each include a welding surface;
    c) pre-machining the first blank and the second blank and finish machining the welding surface of the first blank and the welding surface of the second blank to form a machined first blank and a machined second blank, wherein the machined first blank has a first cooling duct region and the machined second blank has a second cooling duct region;
    d) connecting the machined first blank corresponding to the piston main body and the machined second blank corresponding to the piston ring part via welding the welding surface of the first blank to the welding surface of the second blank to form a piston body, wherein the piston body defines an annular cooling duct via the first cooling duct region and the second cooling duct region; and
    e) performing at least one of a secondary machining process and a finish machining process on the piston body to produce the piston, wherein step e) includes forming boss bores into the plurality of piston bosses.

2. The method as claimed in claim 1, wherein step c) further includes at least one of (i) forming the first cooling duct region in the first blank and forming the second cooling duct region in the second blank, and (ii) finishing the first cooling duct region and the second cooling duct region via machining.

3. The method as claimed in claim 2, wherein step c) further includes pre-machining an outer diameter of at least one of the first blank and the second blank.

4. The method as claimed in claim 2, wherein step c) further includes pre-machining the plurality of piston bosses on the first blank.

5. The method as claimed in claim 1, wherein the first blank corresponding to the piston main body defines an interior space, and wherein step c) further includes finish-machining the interior space and forming an inlet opening and an outlet opening for a cooling fluid into the first cooling duct region of the first blank.

6. The method as claimed in claim 1, wherein step c) further includes at least one of (i) pre-machining an outer diameter of at least one of the first blank corresponding to the piston main body and the second blank corresponding to the piston ring part, and (ii) pre-machining the plurality of piston bosses on the first blank corresponding to the piston main body.

7. The method as claimed in claim 1, wherein step e) of performing the at least one of the secondary machining process and the finish machining process on the piston body includes finish machining the piston crown, and wherein the boss bores are formed into the plurality of piston bosses after the piston crown has been finish-machined.

8. The method as claimed in claim 1, wherein producing the first blank corresponding to the piston main body includes forging the first blank via a hot working method at a temperature ranging from 1200° C. to 1300° C. and subsequently cold working the first blank.

9. The method as claimed in claim 1, wherein producing the first blank corresponding to the piston main body includes forging the first blank via a hot working method at a temperature ranging from 1200° C. to 1300° C., after which the first blank is cold calibrated at a temperature of 150° C. or less.

10. The method as claimed in claim 1, wherein producing the first blank corresponding to the piston main body includes forging the first blank via a warm working method at a temperature ranging from 600° C. to 900° C.

11. The method as claimed in claim 10, further comprising cold working the first blank at a temperature of 150° C. or less after performing the warm working method.

12. The method as claimed in claim 1, wherein producing the first blank corresponding to the piston main body includes forging the first blank via a cold working method at a temperature of 150° C. or less.

13. The method as claimed in claim 1, wherein the combustion depression is disposed asymmetrical with respect to a piston central axis.

14. The method as claimed in claim 1, wherein the combustion depression is disposed radially offset with respect to a piston central axis.

15. The method as claimed in claim 1, wherein the combustion depression is disposed inclined with respect to a piston central axis.

16. The method as claimed in claim 1, wherein the first blank and the second blank each include a plurality of welding surfaces, the first blank including a first welding surface on the first cooling duct region and a second welding surface on a radially outer side opposite of the combustion depression with respect to a piston central axis, and the second blank including a third welding surface on the second cooling duct region and a fourth welding surface in a region of the piston crown on a side radially inwards of the fire land; and wherein step d) further includes connecting the machined first blank and the machined second blank via welding the first welding surface of the machined first blank to the third welding surface of the machined second blank and the second welding surface of the machined first blank to the fourth welding surface of the machined second blank.

17. The method as claimed in claim 1, wherein the contour of the combustion depression is finished via forging in step a).

18. A method for producing a piston for an internal combustion engine, comprising the steps of:

a) producing a first blank corresponding to a piston main body via a deformation process, wherein producing the first blank corresponding to the piston main body includes providing a combustion depression defining a contour having a dome and a plurality of piston bosses connected to one another via a running surface, the contour of the combustion depression being fully produced, and wherein producing the first blank further includes forming a first weld surface on a radially outer side opposite of the combustion depression with respect to a piston central axis;

b) producing a second blank corresponding to a piston ring part via at least one of a deformation process and a casting process, wherein producing the second blank corresponding to the piston ring part includes providing a piston crown, an annular fire land and an annular ring section arranged away from a region of combustion with respect to the fire land, and wherein producing the second blank further includes forming a second welding surface in a region of the piston crown on a radially inner side opposite of the annular fire land with respect to the piston central axis;

c) pre-machining the first blank and the second blank and finish machining the first welding surface and the second welding surface to form a machined first blank and a machined second blank, wherein the machined first blank has a first cooling duct region and the machined second blank has a second cooling duct region;

d) connecting the machined first blank corresponding to the piston main body and the machined second blank corresponding to the piston ring part to form a piston body having an annular cooling duct via the first cooling duct region and the second cooling duct region, wherein connecting the machined first blank and the machined second blank includes welding the first welding surface and the second welding surface together to form the piston body with a welded connection disposed radially outside of the combustion depression; and e) performing at least one of a secondary machining process and a finish machining process on the piston body to produce the piston;

wherein step e) includes forming boss bores into the plurality of piston bosses after the piston crown has been finish-machined to provide a predetermined compression height of the piston.

* * * * *